United States Patent [19]
Coulter

[11] 3,952,488
[45] Apr. 27, 1976

[54] FRUIT PICKER

[76] Inventor: Mark B. Coulter, P.O. Box 3352, St. Petersburg, Fla. 33731

[22] Filed: Jan. 7, 1975

[21] Appl. No.: 539,257

[52] U.S. Cl. .................................................. 56/333
[51] Int. Cl.² ........................................ A01D 46/24
[58] Field of Search ..................... 56/332, 333, 334; 294/22, 115

[56] References Cited
UNITED STATES PATENTS

| | | | |
|---|---|---|---|
| 68,030 | 8/1867 | Barnes | 56/333 |
| 602,551 | 4/1898 | Anderson | 56/334 |
| 792,018 | 6/1905 | Gallup | 56/333 |
| 1,490,263 | 4/1924 | Gallup | 56/333 |
| 2,526,340 | 10/1950 | Felsing | 56/334 |

Primary Examiner—Russell R. Kinsey
Attorney, Agent, or Firm—Webster B. Harpman

[57] ABSTRACT

A fruit picker positions a fixed and a movable jaw on a pole-like handle and encloses a majority of the jaw area with an open top fabric bag. Springs are provided normally urging the jaws toward or away from one another and act to hold the uppermost portion of the fabric bag in open position at all times. An actuating cord extends downwardly along the pole-like handle for manual operation of the device. An adjustable stop limits the degree of closure of the jaws to avoid clamping engagement on a limb or a twig.

6 Claims, 2 Drawing Figures

U.S. Patent  April 27, 1976  3,952,488

FRUIT PICKER

BACKGROUND OF THE INVENTION

1. Field of the Invention:

This invention relates to fruit pickers of the type positioned on poles and operated from the ground to remove fruit from trees.

2. Description of the Prior Art:

Prior devices have included various arrangements of multiple jaws and means for moving them and for suspending a sack therefrom as in U.S. Pat. No. 621,509.

Still other prior art devices have provided a fixed and a movable jaw arranged in a sidewardly projecting plane and directly engageable on fruit to be picked as in U.S. Pat. Nos. 60,249 and 68,030. Substantially vertically positioned fixed and movable jaws, one of which is provided with serrations, may be seen in U.S. Pat. No. 1,415,945.

This invention eliminates the problems found in the prior art structures and specifically the difficulty encountered in the engagement of the jaws on the fruit and/or supporting limbs.

SUMMARY OF THE INVENTION

A fruit picker comprises a pole-like handle having a fixed jaw on the upper end thereof and a movable jaw hinged thereto. The jaws are formed with spaced, parallel members easily positioned over one or more pieces of fruit and movable toward one another so that the fruit can be pulled free of the tree. An open top sack is formed around the jaws and spaced substantially outwardly with respect to the fruit and/or stem engaging portions thereof and spring means hold the open top sack in open position at all times.

DESCRIPTION OF THE PREFERRED EMBODIMENT

Figure 1:
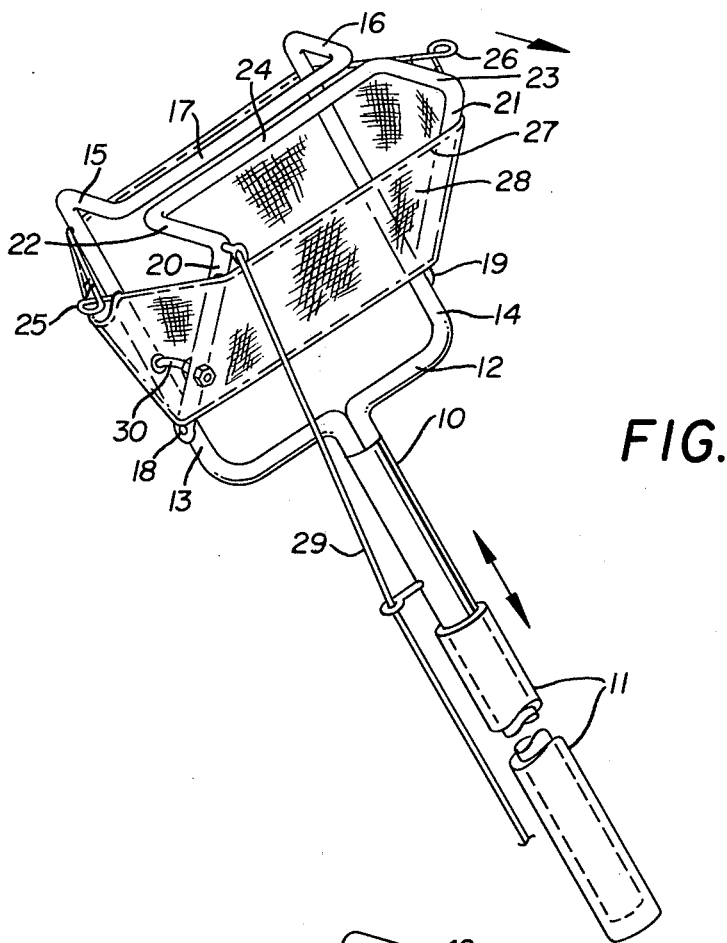
FIG. 1 is a perspective elevation of the fruit picker showing the jaws spring urged toward one another.

In the form of the invention chosen for illustration in FIG. 1 of the drawings, the fruit picker comprises a pole-like handle 10, the lower portion of which is extensible as by a telescopic tubular extension 11. A bifurcated fixed jaw 12 is attached to the upper end of the pole-like handle 10 and comprises a tubular member portions of which extend outwardly and oppositely with respect to the pole-like handle 10 and then turn upwardly and define spaced parallel portions 13 and 14. These in turn have right angular parallel extensions 15 and 16 on their upper ends and a cross sectionally round or tubular jaw portion 17 interconnects the same so that the jaw portion 17 is offset with respect to the plane of the parallel portions 13 and 14.

A movable jaw of somewhat similar configuration is pivotally attached to the parallel members 13 and 14 of the fixed jaw 12 by pivots 18 and 19 and consists of spaced parallel upwardly extending portions 20 and 21 having right angular portions 22 and 23 on their uppermost ends which are joined by an interconnecting, cross sectionally round or a tubular jaw 24.

Still referring to FIG. 1 of the drawings, it will be seen that the right angular portions 22 and 23 of the movable jaw are oppositely disposed with respect to the right angular portions 15 and 16 of the fixed jaw as heretofore described so that the jaw 24 is offset with respect to the plane of the portions 20 and 21 and so that it lies in spaced parallel relation to the jaw 17. Springs 25 and 26 having at least one convolution intermediate their ends are positioned between the members 13 and 20 on the left side of the fruit picker as seen in FIG. 1 of the drawings and between the members 14 and 21 on the right side and the springs 25 and 26 are engaged in hems 27 in the top side portions of a fabric bag 28 which is relatively wide with a large top and a relatively smaller lower portion which is attached to the portions 13 and 14 of the fixed jaw 12 and to the portions 20 and 21 of the movable jaw pivoted thereto so that an open top fabric bag is provided.

As seen in FIG. 1 of the drawings, the spaced parallel longitudinal upper edges of the bag 28 which are defined by continuations of the hems 27, are spaced outwardly a considerable distance with respect to the actual fruit and/or limb engaging jaw portions 17 and 24 as hereinbefore described.

A cord 29 is attached to the movable jaw by an eyelet and extends down the pole-like handle 10 to a point where it may be manually grasped and pulled to open the jaws of the fruit picker as illustrated in FIG. 1. The springs 25 and 26 normally urge the jaws toward one another. In use the cord 29 is pulled, the jaws opened and the spaced parallel jaw portions 17 and 18 of the device positioned above and on either side of the fruit to be picked, the cord relaxed to permit the jaws to move towards one another and their final positioning is determined by an adjustable stop 30 positioned between the portions 13 and 20 of the jaw structures as seen in FIG. 1 of the drawings. Downward motion of the fruit picker will then free the fruit from its supporting limb or branch and it will fall into the very wide mouth flexible bag 28, the sides of which are being held in wide open arrangement by the springs 25 and 26 as hereinbefore described.

A modification of the fruit picker invention may be seen in FIG. 2 of the drawings, wherein spaced parallel cross sectionally round or tubular jaws 32 and 33 are illustrated, the jaw 32 is on the upper end of a bifurcated fixed jaw 34 and the jaw 33 is on the upper end of a bifurcated movable jaw 35 which is pivoted by pivots 36 and 37 to the spaced parallel portions of the fixed jaw 34 just as in the construction heretofore described in connection with FIG. 1 of the drawings.

An extension of a portion of the bifurcated movable jaw 35 is indicated by the numeral 38 and a cord 39 attached thereto extends down the pole so that movement of the cord downwardly along the pole will move the jaw 33 towad the jaw 32. The jaw 33 cannot touch the jaw 32 because of the presence of an adjustable stop 40 on a portion of the movable jaw 35 arranged to engage a portion of the fixed jaw 34.

Figure 2:
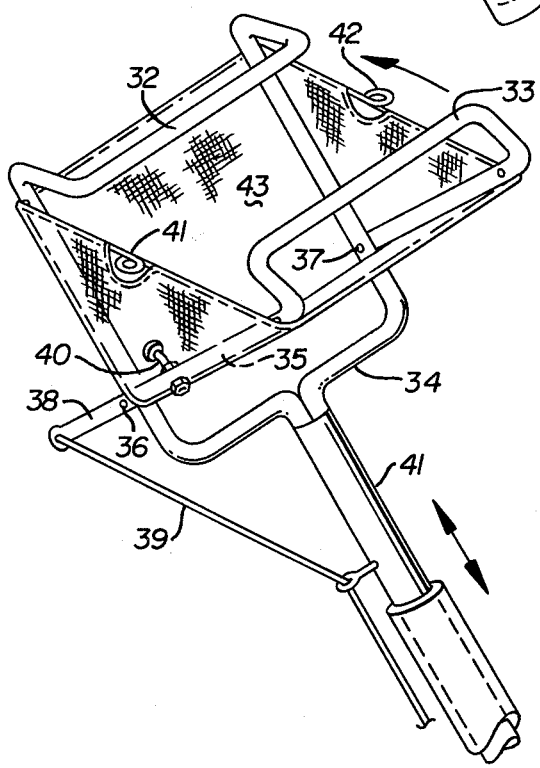
FIG. 2 is a perspective elevation showing the jaws spring urged away from one another.

The modification of the fruit picker illustrated in FIG. 2 is thus operable in a manner similar to that heretofore described except that the jaws are closed by pulling the cord 39 and springs 41 and 42 normally urge them apart. Like the construction of FIG. 1 a wide mouth fabric bag 43 is positioned below and outwardly of the jaws 32 and 33 and held in such a position at all times by the arrangement of the springs 41 and 42 which act to move the upper edges of the sides of the bag 43 outwardly when the jaws 32 and 33 are moved toward one another.

It will thus be seen that a simple and efficient fruit picker has been disclosed which provides a novel fruit and/or limb engaging configuration in the spaced parallel jaws 17 and 24 of the preferred embodiment or the jaws 32 and 33 of the modification and that such configuration and arrangement of the jaws and the remainder of the fruit picker insure the ease of operation in engaging the jaws over the fruit to be picked and the insurance that the fruit when freed from the tree will be captured in the associated fabric bag.

Having thus described my invention what I claim is:

1. A fruit picker comprising a fixed jaw on a pole-like handle, a movable jaw and means pivotally securing said movable jaw to said fixed jaw, means for moving said movable jaw relative to said fixed jaw, said fixed jaw being bifurcated and having spaced parallel portions, right angular parallel extensions on said spaced parallel portions and an elongated straight portion joining said right angular extensions, said movable jaw having secondary spaced parallel portions, secondary right angular extensions on said secondary parallel portions of said movable jaw and a secondary elongated straight portion joining said secondary right angular extensions, said means pivoting said movable jaw to said fixed jaw engaging said spaced parallel portions and secondary spaced parallel portions respectively, said straight portions arranged in normally closely spaced parallel relation to one another, a bag having an enlarged open upper end secured to said jaws in outwardly spaced relation to said straight portions.

2. The fruit picker set forth in claim 1 and wherein said bag is positioned around and about the fixed and movable jaws longitudinally from said pole-like handle, means in the upper edges of said bag between the movable and the fixed jaw normally urging the sides of the bag outwardly with respect thereto.

3. The fruit picker set forth in claim 1 and wherein the means for moving the jaws of the fruit picker comprise an actuating cord attached to one of said jaws and extending downwardly along said pole-like handle and spring members positioned between said fixed and movable jaws.

4. The fruit picker set forth in claim 1 and wherein an adjustable stop member is secured to one of the jaws and arranged for engagement with the other to insure the normally spaced relation of the jaw portions.

5. The fruit picker set forth in claim 1 and wherein said parallel jaw portions are normally spaced with respect to one another a distance less than the diameter of the fruit to be picked.

6. The fruit picker set forth in claim 4 and wherein said adjustable stop is movable between a first position where the jaw portions are widely spaced to a second position where the jaw portions are closely spaced.

* * * * *